(12) United States Patent
Kishi et al.

(10) Patent No.: US 10,102,438 B2
(45) Date of Patent: Oct. 16, 2018

(54) INFORMATION DISPLAY DEVICE

(71) Applicant: TOYOTA JIDOSHA KABUSHIKI KAISHA, Toyota-shi, Aichi (JP)

(72) Inventors: Hiroshi Kishi, Toyota (JP); Takatsune Kumada, Kyoto (JP); Ryoichi Nakashima, Tokyo (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days.

(21) Appl. No.: 15/587,657

(22) Filed: May 5, 2017

(65) Prior Publication Data

US 2017/0323164 A1    Nov. 9, 2017

(30) Foreign Application Priority Data

May 6, 2016 (JP) ................................ 2016-093448

(51) Int. Cl.
*G06K 9/00* (2006.01)
*G06T 7/50* (2017.01)
(Continued)

(52) U.S. Cl.
CPC .......... *G06K 9/00805* (2013.01); *B60K 35/00* (2013.01); *B60R 1/00* (2013.01);
(Continued)

(58) Field of Classification Search
CPC .............. G06K 9/00805; G06T 7/50; G06T 2207/30261; G02B 27/01; G02B 27/0101;
(Continued)

(56) References Cited

U.S. PATENT DOCUMENTS 6,327,536 B1* 12/2001 Tsuji ..................... B60Q 9/008
340/435
8,704,653 B2* 4/2014 Seder ....................... B60R 1/00
340/435
(Continued)

FOREIGN PATENT DOCUMENTS

JP    2009-137341 A    6/2009
JP    2012-050690 A    3/2012
(Continued)

*Primary Examiner* — Antonio A Caschera
(74) *Attorney, Agent, or Firm* — Sughrue Mion, PLLC

(57) ABSTRACT

An information display device includes an attention object recognition unit that recognizes a plurality of attention objects, a traveling state recognition unit that recognizes a vehicle speed of a vehicle, a HUD that displays attention display, an attention depth calculation unit that calculates TTC and calculates attention depths for the attention objects on the basis of the TTC, a display information generation unit that determines a first attention object having the largest attention depth among the plurality of attention objects and generates first display information regarding first attention display for highlighting the first attention object and second display information regarding second attention display which is a line surrounding the first attention object and second attention objects other than the first attention object among the plurality of attention objects, and a display control unit that displays the first attention display and the second attention display on the HUD.

6 Claims, 9 Drawing Sheets

(51) Int. Cl.
  *B60R 1/00*  (2006.01)
  *G02B 27/01*  (2006.01)
  *G06T 11/00*  (2006.01)
  *G06T 11/60*  (2006.01)
  *H04N 5/232*  (2006.01)
  *H04N 7/18*  (2006.01)
  *B60K 35/00*  (2006.01)

(52) U.S. Cl.
  CPC ..... *G02B 27/0101* (2013.01); *G02B 27/0179* (2013.01); *G06T 7/50* (2017.01); *G06T 11/001* (2013.01); *G06T 11/60* (2013.01); *H04N 5/23293* (2013.01); *H04N 7/183* (2013.01); *B60K 2350/1096* (2013.01); *B60K 2350/2013* (2013.01); *B60K 2350/2052* (2013.01); *B60K 2350/921* (2013.01); *B60K 2350/965* (2013.01); *B60R 2300/107* (2013.01); *B60R 2300/205* (2013.01); *B60R 2300/301* (2013.01); *G02B 2027/014* (2013.01); *G02B 2027/0141* (2013.01); *G02B 2027/0183* (2013.01); *G06K 9/00845* (2013.01); *G06T 2207/10024* (2013.01); *G06T 2207/30261* (2013.01)

(58) Field of Classification Search
  CPC .......... G02B 27/0179; B60R 2300/205; B60R 2300/301
  See application file for complete search history.

(56) References Cited

U.S. PATENT DOCUMENTS

| | | |
|---|---|---|
| 2009/0140845 A1 | 6/2009 | Hioki |
| 2012/0314074 A1* | 12/2012 | Aimura .............. G06K 9/00362 348/148 |
| 2013/0176329 A1* | 7/2013 | Toyoda .................. G06T 11/00 345/593 |
| 2013/0325478 A1 | 12/2013 | Matsumoto et al. |
| 2015/0015712 A1 | 1/2015 | Sempuku |
| 2015/0062141 A1* | 3/2015 | Hayasaka ................ B60R 1/00 345/581 |
| 2015/0339589 A1* | 11/2015 | Fisher .................. G06N 99/005 706/12 |
| 2017/0106750 A1 | 4/2017 | Tauchi et al. |

FOREIGN PATENT DOCUMENTS

| | | |
|---|---|---|
| JP | 2013-242763 A | 12/2013 |
| JP | 2015-138383 A | 7/2015 |
| JP | 2015-197706 A | 11/2015 |
| WO | 2013/118191 A1 | 8/2013 |

* cited by examiner

INFORMATION DISPLAY DEVICE

CROSS-REFERENCE TO RELATED APPLICATION

This application is based on Japanese Patent Application No. 2016-093448 filed with Japan Patent Office on May 6, 2016, the entire contents of which are hereby incorporated by reference.

TECHNICAL FIELD

The present disclosure relates to an information display device.

BACKGROUND

In recent years, Patent Document 1 (Japanese Unexamined Patent Publication No. 2013-242763) discloses a conversation device that converses with a driver who drives a vehicle. The conversation device includes a storage unit that stores a candidate having contents of conversation with the driver, a conversation effect indicating the degree of improvement in the concentration level of the driver on driving, and the driver's preference in association with each other. The conversation device converses with the driver in accordance with the conversation contents corresponding to a candidate selected on the basis of the conversation effect and the preference, to thereby improve the degree of concentration of the driver on driving.

SUMMARY

In a case where an automatic driving system is mounted on a vehicle, it is assumed that a driver behaves so as to perform an operation of driving a vehicle in an urgency evasion scene and the like, while allowing the automatic driving system to drive in a normal traffic scene. For this reason, the driver does not perform an operation driving a vehicle during automatic driving of the automatic driving system, but it is desired that the driver pays attention to contents of the automatic driving and monitors the surroundings of the vehicle. However, conversation realized by the device disclosed in Patent Document 1 is determined on the basis of the driver's preference (for example, music). For this reason, there is a concern that the driver cannot sufficiently pay attention to the driving of the vehicle according to the automatic driving system.

An object of an aspect of this disclosure is to provide an information display device capable of urging a driver to pay attention to driving according to an automatic driving system.

In order to solve the above-described problem, the inventors have found a basic principle illustrated in FIG. 6 as a result of wholeheartedly researching. FIG. 6 is a conceptual diagram illustrating a basic principle of an information display device. As illustrated in FIG. 6, the inventors have considered that the intention to drive (operate) a vehicle according to the automatic driving system is understood by the driver and is shared, in a case where "joint attention" is established between an automatic driving system and a driver. The inventors have considered that the driver can pay attention to driving and continue paying attention to the driving by an intention sharing even during automatic driving according to the automatic driving system. Meanwhile, the "joint attention" means that the driver is notified through a display unit or the like which object among objects in the vicinity of the vehicle is recognized and monitored by the automatic driving system, for example, on the basis of information regarding the objects which is acquired by an external sensor of the vehicle, or the like.

The inventors have carried out a psychological experiment in order to verify the above-described finding. In the psychological experiment, a plurality of test subjects (twenty healthy adults) are instructed to perform a key operation ("key pressing") for stopping a ball moving on a screen at any position during the movement of the ball. As experiment conditions, a stop mode (normal stop/sudden stop) of the ball, a movement speed (low speed/high speed) of the ball, and a display mode (display/non-display) of an attention object (goal which is a scheduled stop position) are changed. FIGS. 7A and 7B and FIGS. 8A and 8B illustrate an example of a screen 100 which is used in a psychological experiment. In the example illustrated in FIG. 7A, a ball 101 moves from the left side in a screen 100, starts to gradually decelerate after "key pressing", and stops in the vicinity of a goal 102 which is not displayed. That is, the experiment is an experiment under a situation in which a ball stop condition is a normal stop and an attention object is not displayed. In the example illustrated in FIG. 7B, the ball 101 moves from the left side in the screen 100, starts to gradually decelerate after "key pressing", and stops in the vicinity of the goal 102 which is displayed. That is, the experiment is an experiment under a situation in which a ball stop condition is a normal stop and an attention object is displayed. In the example illustrated in FIG. 8A, the ball 101 moves from the left side in the screen 100, suddenly decelerates after "key pressing", and stops in the vicinity of the goal 102 which is not displayed. That is, the experiment is an experiment under a situation in which a ball stop condition is a sudden stop and an attention object is not displayed. In the example illustrated in FIG. 8B, the ball 101 moves from the left side in the screen 100, suddenly decelerates after "key pressing", and stops in the vicinity of the goal 102 which is displayed. That is, the experiment is an experiment under a situation in which a ball stop condition is a sudden stop and an attention object is displayed.

Meanwhile, in 75% of all of the psychological experiments, the ball 101 was automatically controlled so as to automatically stop at the goal 102, regardless of "key pressing" of the test subject. This automatic control imitated automatic driving of a vehicle. In this case, the goal 102 is equivalent to an object to be monitored (an attention object of the driver) of the automatic driving system.

The test subject performed a key operation of stopping the ball 101 and then made a reply by representing a sense of agency in test subject's operation of stopping the ball 101 as a numeral between 0 and 100. The results thereof are illustrated in FIG. 9. FIG. 9 is a diagram illustrating results of the psychological experiments of FIGS. 7A, 7B, 8A, and 8B. As illustrated in FIG. 9, in a case where the goal 102 was displayed regardless of a stop mode (normal stop/sudden stop) of the ball, it was confirmed that the sense of agency in the test subject's operation was increased, as compared to a case where the goal 102 was not displayed.

Based on the above-described finding, the inventors have found that it is possible to effectively support a driver's paying attention to driving of a vehicle according to an automatic driving system by displaying an attention object, and have completed the invention.

An information display device according to an aspect of this disclosure is an information display device that displays attention display during automatic driving of a vehicle, and includes an attention object recognition unit configured to recognize a plurality of attention objects present in a vicinity of the vehicle, a traveling state recognition unit configured to recognize a traveling state of the vehicle, a display unit configured to display attention display, an attention depth calculation unit configured to calculate a predicted time until the vehicle contacts one of the attention objects, on the basis of a recognition result of the attention object recognition unit and a recognition result of the traveling state recognition unit, and to calculate an attention depth for the attention object on the basis of the predicted time, a display information generation unit configured to determine a first attention object having a largest attention depth among the plurality of attention objects, and to generate first display information regarding first attention display for highlighting the first attention object and second display information regarding second attention display which is a line surrounding the first attention object and second attention objects other than the first attention object among the plurality of attention objects, on the basis of the recognition result of the attention object recognition unit and the recognition result of the traveling state recognition unit, and a display control unit configured to display the first attention display and the second attention display on the display unit on the basis of the first display information and the second display information.

According to an aspect of this disclosure, it is possible to provide an information display device capable of urging a driver to pay attention to driving according to an automatic driving system.

DETAILED DESCRIPTION

Figure 1:
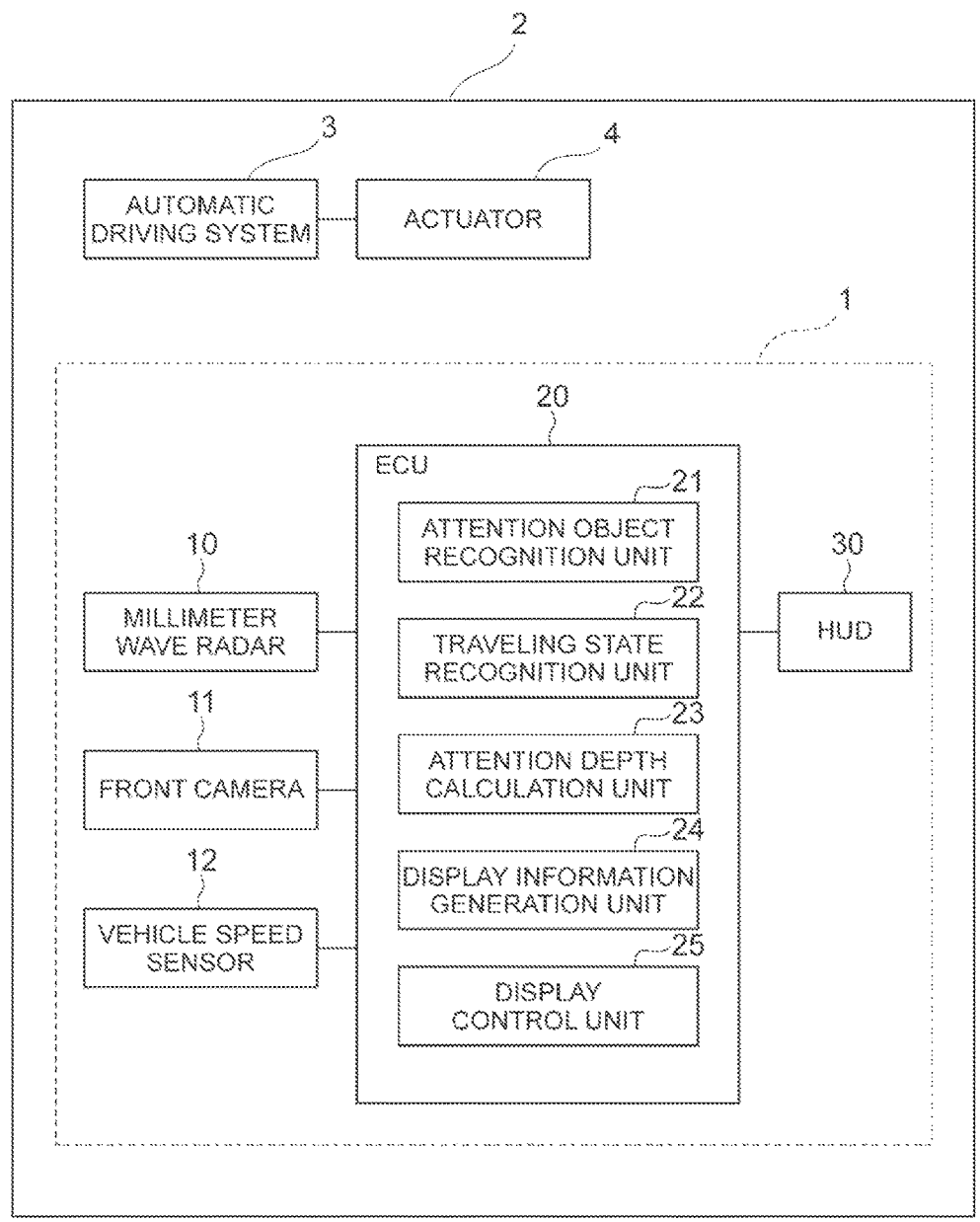
FIG. 1 is a block diagram illustrating an outline of a configuration of an information display device according to an embodiment.

Hereinafter, an embodiment of this disclosure will be described with reference to the accompanying drawings. Meanwhile, in the following description, the same or corresponding components will be denoted by the same reference numerals and signs, and a description thereof will not be repeated.

FIG. 1 is a block diagram illustrating an outline of a configuration of an information display device 1 according to this embodiment. In FIG. 1, the information display device 1 according to this embodiment is mounted on a vehicle 2 including an automatic driving system 3. The information display device 1 displays attention display by projecting the attention display onto a windshield W in an automatic driving state of the vehicle 2 according to the automatic driving system 3. The automatic driving state means a driving state where the vehicle 2 automatically travels by the automatic driving system 3. The automatic driving includes speed control and steering control. The automatic driving system 3 recognizes the vicinity of the vehicle 2 through an external sensor (for example, a millimeter wave radar 10, a front camera 11, and the like to be described later), and operates an actuator 4 to thereby perform the automatic driving of the vehicle 2.

The attention display displayed by the information display device 1 is display for urging a driver (crew) to pay attention to driving according to the automatic driving system 3. As a specific example, the attention display is an object, such as a character, a sign, or a figure, which is visually recognizable, and includes display related to an attention object. The attention object means an object which is recognized through an external sensor (for example, the millimeter wave radar 10, the front camera 11, and the like to be described later) and is monitored by the automatic driving system 3 during automatic driving. As a specific example, the attention object is a preceding vehicle to be followed by the automatic driving system 3, an obstacle to be avoided, or the like.

The information display device 1 includes the millimeter wave radar 10, the front camera 11, a vehicle speed sensor 12, an electronic control unit (ECU) 20, and a head-up display (HUD) 30.

The millimeter wave radar 10 is a detection apparatus that detects outside conditions which are peripheral information of the vehicle 2. The millimeter wave radar 10 detects an attention object outside the vehicle 2 by using radio waves (millimeter waves). It is possible to adopt a well-known configuration as the millimeter wave radar 10. The millimeter wave radar 10 transmits detection information of the detected attention object to the ECU 20.

The front camera 11 is an imaging apparatus that images outside conditions of the vehicle 2. The front camera 11 detects an attention object outside the vehicle 2. The front camera 11 is provided on the back side of the windshield W of the vehicle 2. The front camera 11 may be a monocular camera or may be a stereo camera. The front camera 11 transmits imaging information of the detected attention object to the ECU 20.

The vehicle speed sensor 12 is a detector that detects the speed (vehicle speed) of the vehicle 2 as a traveling state of the vehicle 2. It is possible to adopt a well-known configuration as the vehicle speed sensor 12. The vehicle speed sensor 12 outputs the detected vehicle speed to the ECU 20. The information display device 1 may not necessarily include the vehicle speed sensor 12.

The ECU 20 is an electronic control unit that performs control related to the display of information to the crew of the vehicle 2. The ECU 20 is mainly constituted by a computer including a central processing unit (CPU), a read only memory (ROM), and a random access memory (RAM). The millimeter wave radar 10, the front camera 11, the vehicle speed sensor 12, and the HUD 30 are connected to the ECU 20.

The HUD 30 is a display unit that displays attention display. The HUD 30 is an apparatus for projecting attention display (including an image) related to various information within the driver's visual field by irradiating the windshield W with light so that the light is reflected toward the driver. For example, the HUD 30 is provided within a dashboard of the vehicle 2. The HUD 30 projects the attention display onto the windshield W in accordance with a control signal received from the ECU 20. The HUD 30 projects first attention display C1 and second attention display C2 to be described later onto the windshield W in accordance with a control signal received from the ECU 20.

Next, a functional configuration of the ECU 20 will be described. Meanwhile, a portion of the functions of the ECU 20 may be executed by a computer of a facility, such as an information management center, which is capable of communicating with the vehicle 2, or may be executed by a portable information terminal capable of communicating with the vehicle 2. The ECU 20 includes an attention object recognition unit 21, a traveling state recognition unit 22, an attention depth calculation unit 23, a display information generation unit 24, and a display control unit 25.

The attention object recognition unit 21 recognizes a plurality of attention objects present in the vicinity of the vehicle 2. The attention object recognition unit 21 recognizes the positions of the attention objects with respect to the vehicle 2, and relative distances and relative speeds between the vehicle 2 and the attention objects on the basis of detection results of the millimeter wave radar 10 and the front camera 11 (for example, detection information of the attention objects which is obtained by the millimeter wave radar 10 and imaging information of the attention objects which is obtained by the front camera 11). In addition, the attention object recognition unit 21 estimates the position of the vehicle 2 on the windshield W which corresponds to the positions of the attention objects outside the vehicle 2 by using a well-known method. The traveling state recognition unit 22 recognizes a vehicle speed as a traveling state of the vehicle 2 on the basis of the detection results of the vehicle speed sensor 12.

The attention depth calculation unit 23 calculates a time-to-collision (TTC) of each of the attention objects recognized by the attention object recognition unit 21, on the basis of recognition results of the attention object recognition unit 21 and recognition results of the traveling state recognition unit 22 (relative speeds and relative distances between the vehicle 2 and the attention objects). The TTC is a predicted time until the vehicle 2 contacts one of the attention objects. The attention depth calculation unit 23 calculates attention depths for the attention objects recognized by the attention object recognition unit 21, on the basis of the calculated TTC of each of the attention objects. The attention depth means the degree of attention in controlling automatic driving with respect to the respective attention objects recognized by the attention object recognition unit 21. Specifically, the attention depth calculation unit 23 calculates attention depths by calculating a reciprocal of the TTC of each of the attention objects.

Figure 2:
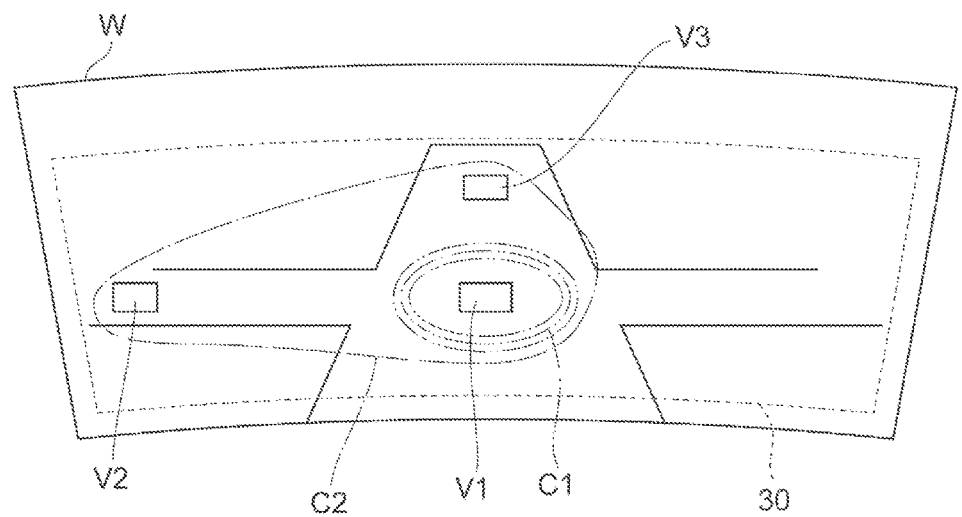
FIG. 2 is a diagram illustrating an example of attention display of the information display device of FIG. 1.

The display information generation unit 24 generates display information for displaying attention display on the HUD 30 in order to urge the driver to pay attention to driving according to the automatic driving system 3. Specifically, as illustrated in FIG. 2, the display information generation unit 24 determines an attention object having the largest attention depth among a plurality of attention objects V1 to V3 to be a first attention object V1 on the basis of the attention depth calculated by the attention depth calculation unit 23. The display information generation unit 24 generates first display information regarding the first attention display C1 on the windshield W and second display information regarding the second attention display C2 on the windshield W, on the basis of the recognition result of the attention object recognition unit 21 and the recognition result of the traveling state recognition unit 22. The attention objects V1 to V3 are not particularly limited, but is, for example, other vehicles that travel in the vicinity of an intersection in front of the vehicle 2.

The first attention display C1 is attention display for highlighting the first attention object V1 on the windshield W. The first attention display C1 is a figure disposed at the position (attention position) of the first attention object V1 on the windshield W of the vehicle 2 as estimated by the attention object recognition unit 21. The first attention display C1 is a figure such as an ellipse surrounding the first attention object V1. The first attention display C1 is emphasized in such a manner that a line thickness of the figure, such as ellipse, is set in accordance with the attention depth. The first attention display C1 may be emphasized in such a manner that the color density of a filling-in of the figure, such as an ellipse, is set in accordance with the attention depth. The first display information includes information regarding the position, color, and external shape of the first attention object V1 on the windshield W.

The second attention display C2 is a line surrounding the first attention object V1 and the second attention objects V2 and V3 other than the first attention object V1 among the plurality of attention objects V1 to V3 on the windshield W. For example, the second attention display C2 is a curve (an envelope curve of the attention objects V1 to V3) which passes through the outer sides of each position of the plurality of attention objects V1 to V3 on the windshield W of the vehicle 2 as estimated by the attention object recognition unit 21. In the second attention display C2, the area inside of the envelope curve becomes larger as each position of the attention objects V1 to V3 becomes farther away from each other. The second display information includes information regarding the position, color, and external shape of the displayed line.

The display control unit 25 transmits a control signal to the HUD 30 on the basis of the first display information regarding the first attention display C1 and the second display information regarding the second attention display C2 which are generated by the display information generation unit 24, to thereby display the first attention display C1 and the second attention display C2 on the HUD 30.

Figure 3:
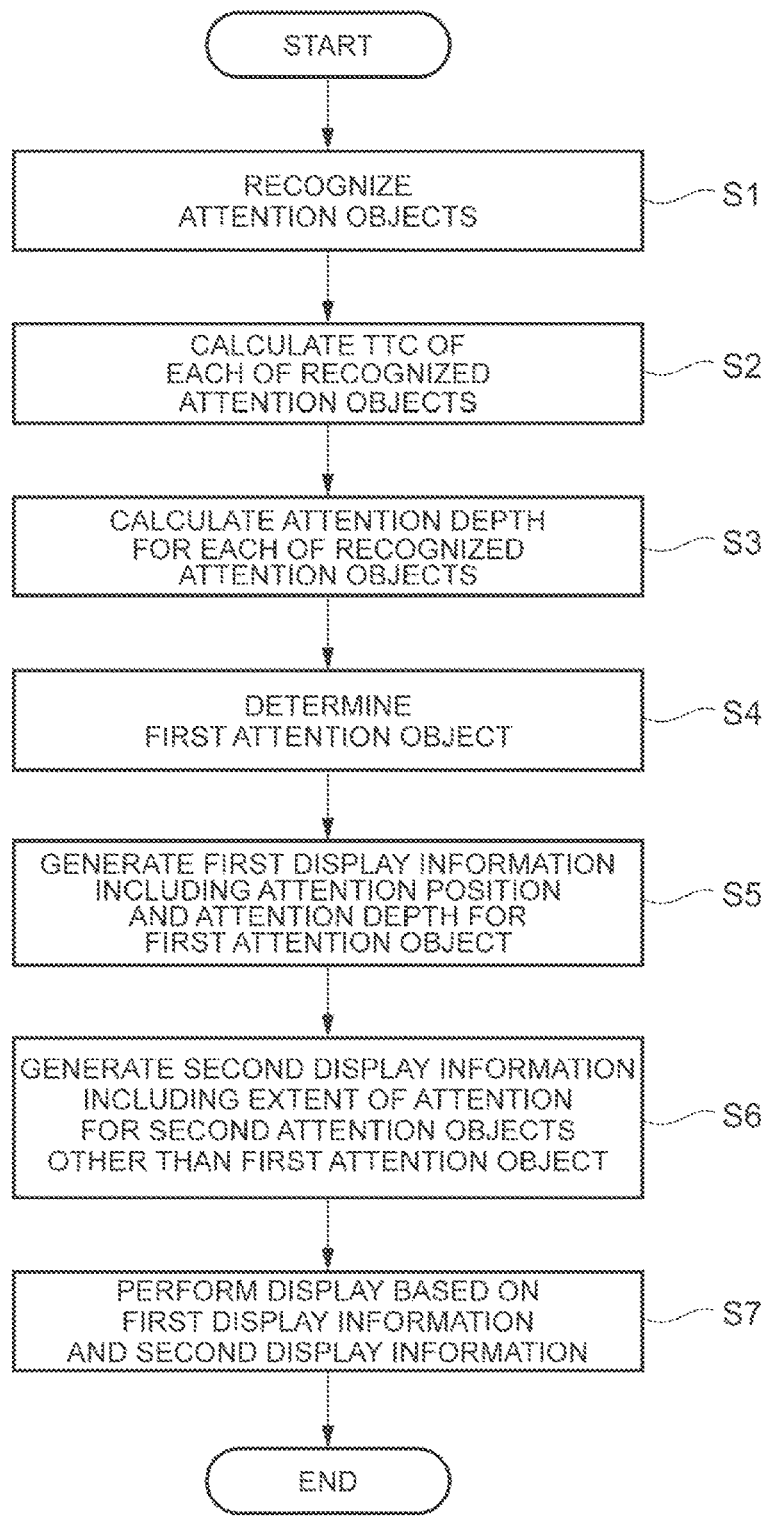
FIG. 3 is a flow chart illustrating a display control process performed by the information display device of FIG. 1.

Next, the operation of the information display device 1 according to this embodiment will be described. FIG. 3 is a flow chart illustrating a display control process performed by the information display device 1 according to this embodiment. The display control process is started according to, for example, an operation of starting automatic driving, and is performed by the ECU 20 during the automatic driving.

As illustrated in FIG. 3, first, attention objects is recognized (step S1). In this process, pieces of detection information of the millimeter wave radar 10, the front camera 11 and the vehicle speed sensor 12 are read by the attention object recognition unit 21. The position of the attention objects with respect to the vehicle 2, and relative distances and relative speeds between the vehicle 2 and the attention objects are recognized by the attention object recognition unit 21 on the basis of the pieces of detection information. Subsequently, a TTC of each of the recognized attention objects is calculated (step S2). In this process, the TTC of each of the attention objects recognized on the basis of the relative distances and the relative speeds calculated in step S1 is calculated by the attention depth calculation unit 23. In addition, an attention depth for each of the recognized attention objects is calculated by the attention depth calculation unit 23 on the basis of the calculated TTC (step S3).

Subsequently, an attention object having the largest attention depth, among the plurality of attention objects V1 to V3, is determined to be the first attention object V1 by the display information generation unit 24 on the basis of the calculated attention depth (step S4). Subsequently, the first display information regarding the first attention display C1 including an attention position and an attention depth for the first attention object V1 is generated by the display information generation unit 24 (step S5). In addition, second display information regarding the second attention display C2 including the extent of attention for the second attention objects V2 and V3 other than the first attention object V1 is generated (step S6). Finally, the first attention display C1 and the second attention display C2 are displayed on the HUD 30 by the display control unit 25 on the basis of the first display information and the second display information respectively generated in steps S5 and S6 mentioned above (step S7).

As described above, according to the information display device 1 of this embodiment, attention depths for the attention objects V1 to V3 are calculated by the attention depth calculation unit 23 on the basis of a reciprocal of the TTC of each of the attention objects V1 to V3. Thereby, as a TTC becomes smaller, a larger attention depth is calculated, and it is possible to increase the attention depth in the attention object V1 having a small TTC. In general, as a TTC becomes smaller, a contact risk becomes greater. The reciprocal of the TTC is adopted as the attention depth, and thus a change in the attention depth based on a change in the TTC becomes larger as the TTC becomes smaller. That is, the reciprocal of the TTC is adopted as the attention depth, and thus it is possible to express that the automatic driving system 3 strengthens monitoring as long as the contact risk becomes greater. According to the information display device 1, the first attention object V1 having the largest attention depth among the plurality of attention objects V1 to V3 is determined by the display information generation unit 24. The first display information regarding the first attention display C1 for highlighting the first attention object V1 and the second display information regarding the second attention display C2 which is the line surrounding the first attention object V1 and the second attention objects V2 and V3 other than the first attention object V1 among the plurality of attention objects V1 to V3 are generated on the basis of a recognition result of the attention object recognition unit 21 and a recognition result of the traveling state recognition unit 22 by the display information generation unit 24. The first attention display C1 which is disposed at the position (attention position) of the first attention object V1 on the windshield W and is emphasized in accordance with the attention depth is displayed on the HUD 30 by the display control unit 25, and the second attention display C2 which is an envelope curve having an extent (the position of the line, area of the line, and the like) according to the positions of the attention objects V1 to V3 is displayed on the HUD 30. For this reason, it is possible to urge a driver to pay attention to driving according to the automatic driving system by making the driver recognize attention positions, attention depths, and the extent of attention.

Figure 4:
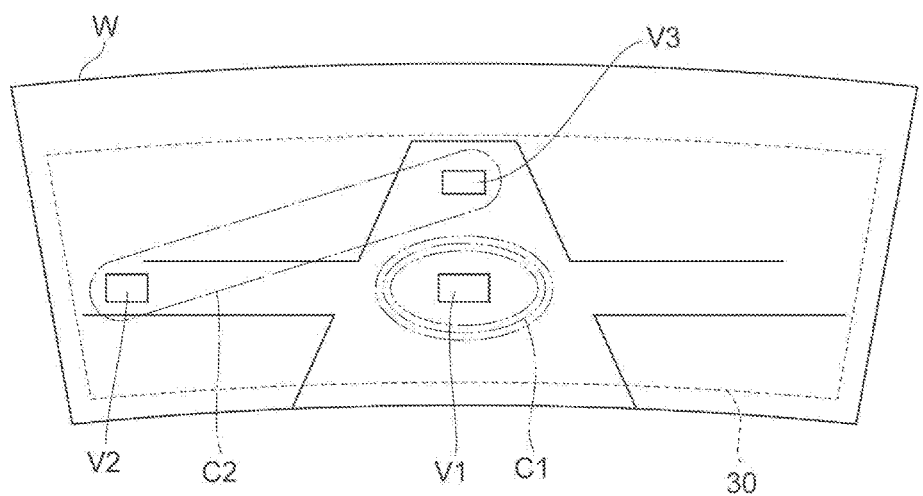
FIG. 4 is a diagram illustrating another example of attention display of the information display device of FIG. 1.
Figure 5:
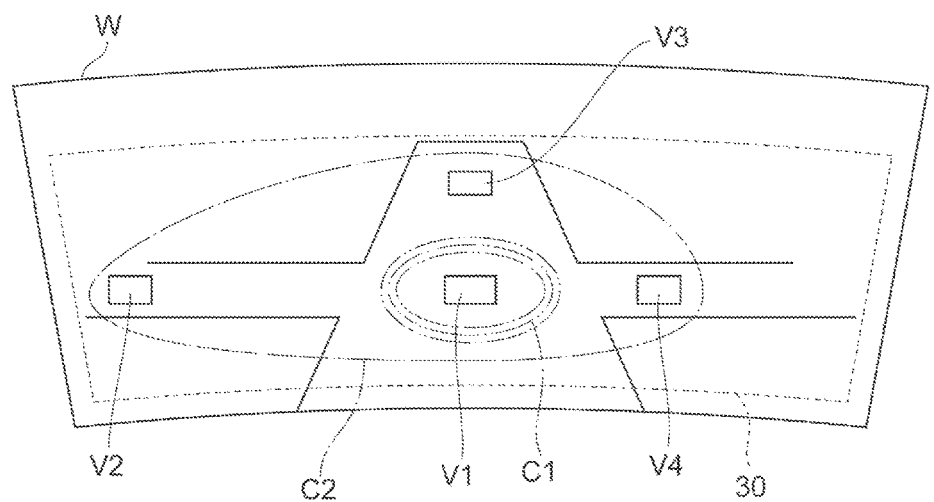
FIG. 5 is a diagram illustrating another example of attention display of the information display device of FIG. 1.
Figure 6:
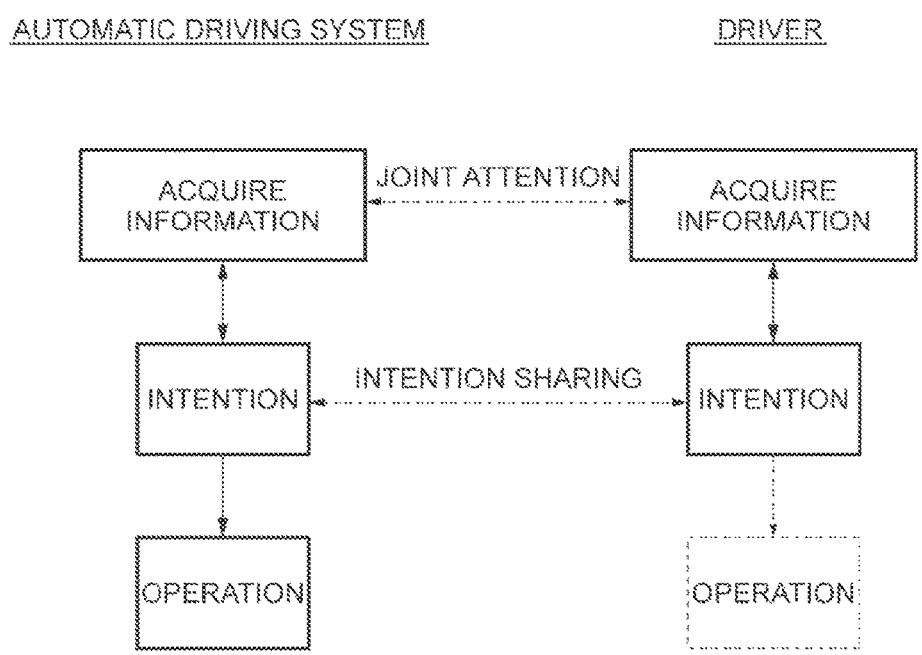
FIG. 6 is a conceptual diagram illustrating a basic principle of the information display device.
Figure 7A:
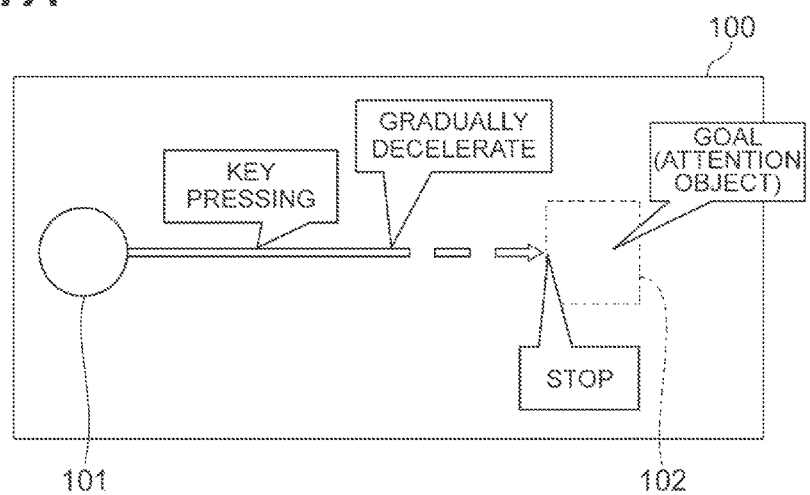
FIG. 7A illustrates an example of display of a screen used in a psychological experiment.
Figure 7B:
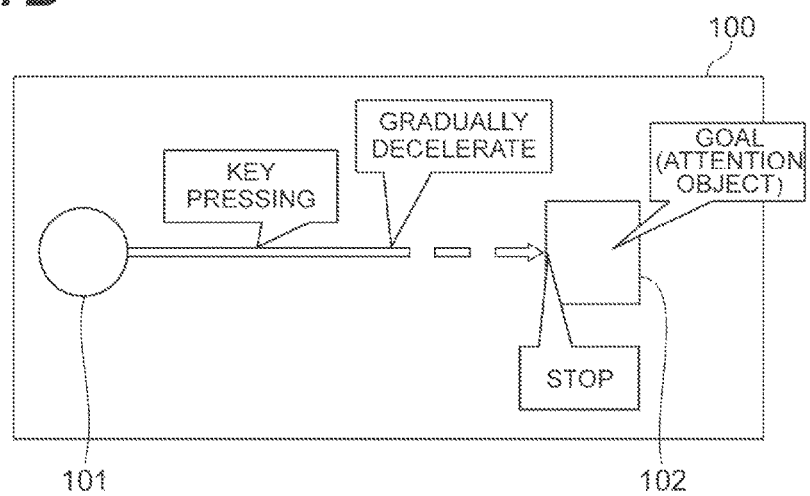
FIG. 7B illustrates an example of display of a screen used in a psychological experiment.
Figure 8A:
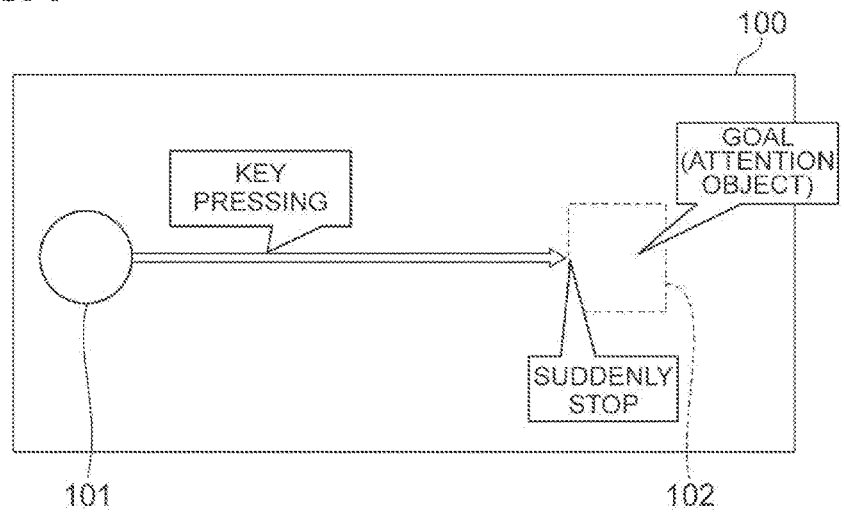
FIG. 8A illustrates an example of display of a screen used in a psychological experiment.
Figure 8B:
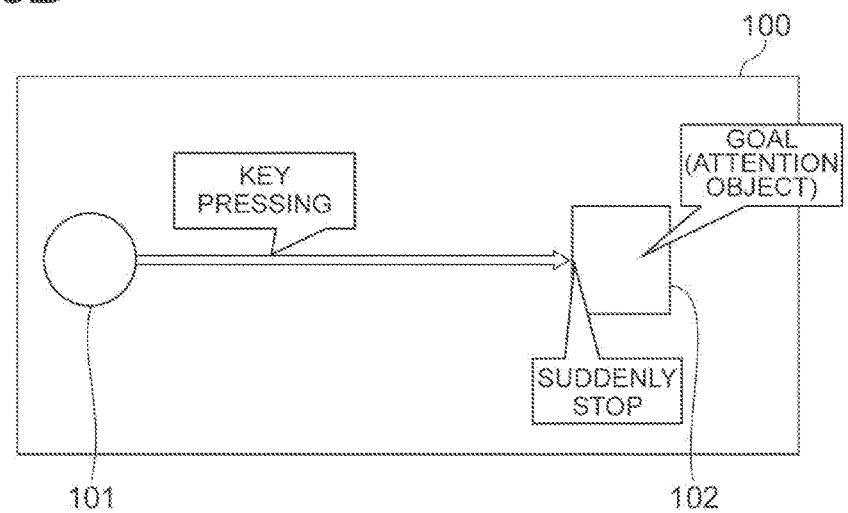
FIG. 8B illustrates an example of display of a screen used in a psychological experiment.
Figure 9:
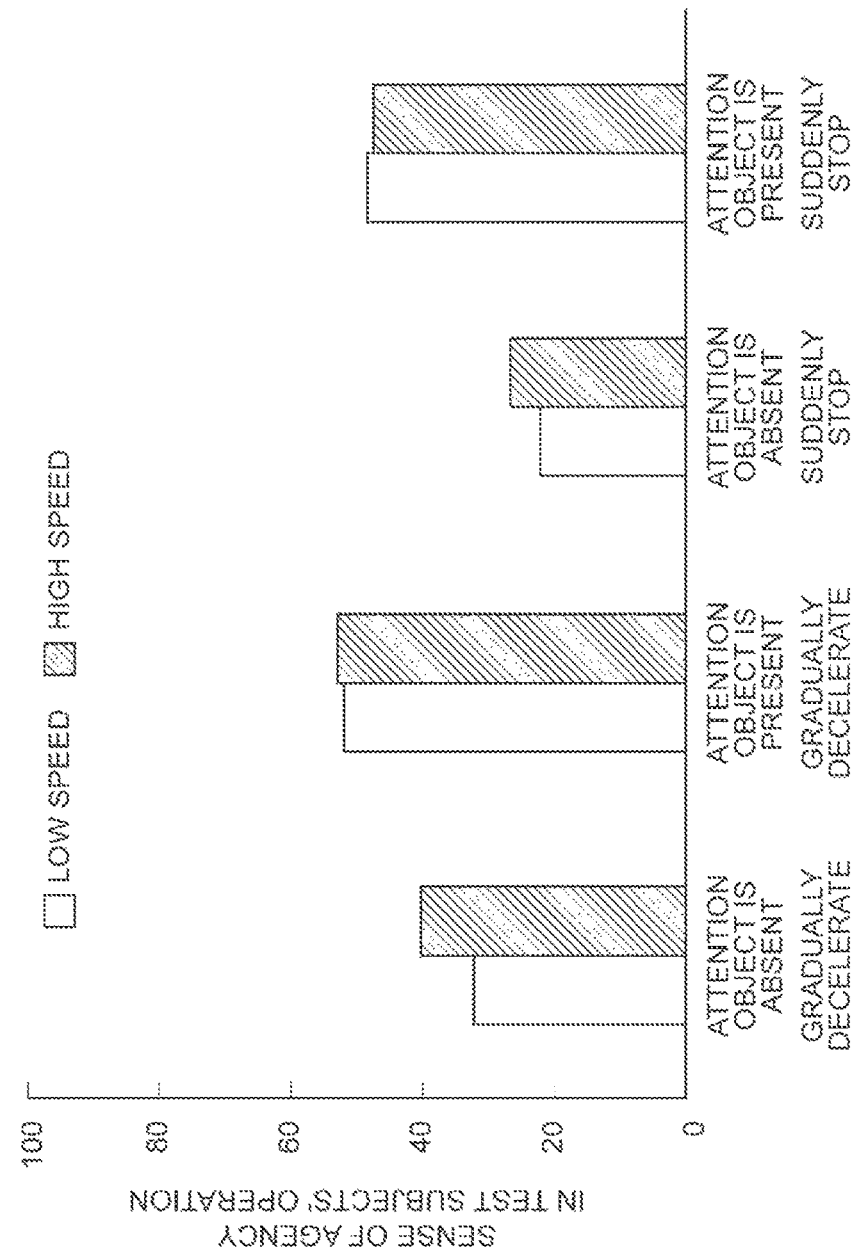
FIG. 9 is a diagram illustrating results of the psychological experiments of FIGS. 7A and 7B and FIGS. 8A and 8B.

Meanwhile, the information display device according to this disclosure is not limited to the information display device 1 described in the above-described embodiment. For example, in the above-described embodiment, the second attention display C2 is attention display regarding a line surrounding the first attention object V1 and the second attention objects V2 and V3 other than the first attention object V1 among the plurality of attention objects V1 to V3. However, the second attention display C2 may be attention display regarding a line surrounding the second attention objects V2 and V3 other than the first attention object V1 among the plurality of attention objects V1 to V3. In this case, the second attention display C2 is the line surrounding the second attention objects V2 and V3 other than the first attention object V1, and thus the first attention object V1 may be present on the outer side of the line of the second attention display C2 (see FIG. 4). In addition, in the example of FIG. 5, the second attention display C2 is a line surrounding the second attention objects V2 to V4 other than the first attention object V1, and consequently, the first attention object V1 may be present on the inner side of the line of the second attention display C2.

The subject of this disclosure is represented, for example, as the following items.

(Item 1)

An information display device that displays attention display during automatic driving of a vehicle, the information display device including:

an attention object recognition unit configured to recognize a plurality of attention objects present in a vicinity of the vehicle;

a traveling state recognition unit configured to recognize a traveling state of the vehicle;

a display unit (for example, HUD 30) configured to display attention display;

an attention depth calculation unit configured to calculate a predicted time (for example, TTC) until the vehicle contacts one of the attention objects, on the basis of a recognition result of the attention object recognition unit and a recognition result of the traveling state recognition unit, and to calculate an attention depth for the attention object on the basis of the predicted time;

a display information generation unit configured to determine a first attention object having a largest attention depth among the plurality of attention objects, and to generate first display information regarding first attention display (for example, first attention display C1) for highlighting the first attention object and second display information regarding second attention display (for example, second attention display C2) which is a line surrounding the first attention object and second attention objects other than the first attention object among the plurality of attention objects, on the basis of the recognition result of the attention object recognition unit and the recognition result of the traveling state recognition unit; and a display control unit configured to display the first attention display and the second attention display on the display unit on the basis of the first display information and the second display information.

According to this disclosure, the first attention object having the largest attention depth among the plurality of attention objects is determined by the display information generation unit. The first display information regarding the first attention display for highlighting the first attention object and the second display information regarding the second attention display which is the line surrounding the first attention object and the second attention objects other than the first attention object among the plurality of attention objects are generated on the basis of the recognition result of the attention object recognition unit and the recognition result of the traveling state recognition unit by the display information generation unit. The first attention display which is disposed at the position (attention position) of the first attention object on a windshield and is emphasized in accordance with the attention depth is displayed on the display unit by the display control unit. The second attention display having an extent (for example, the position of the line, area of the line, and the like) according to each position of the plurality of attention objects is displayed on the display unit by the display control unit. For this reason, it is possible to urge a driver to pay attention to driving according to the automatic driving system by making the driver recognize an attention position, an attention depth, and the extent of attention.

(Item 2)

The information display device according to item 1, wherein the second attention display is an envelope curve passing through outer sides of each position of the plurality of attention objects on a windshield of the vehicle as estimated by the attention object recognition unit.

According to this disclosure, for example, the area inside of the envelope curve becomes larger as each position of the attention objects becomes farther away from each other. In this manner, the driver easily recognizes the extent according to the positions of the respective attention objects by the second attention display being the envelope curve.

(Item 3)

An information display device that displays attention display during automatic driving of a vehicle, the information display device including:

an attention object recognition unit configured to recognize a plurality of attention objects present in a vicinity of the vehicle;

a traveling state recognition unit configured to recognize a traveling state of the vehicle;

a display unit configured to display attention display;

an attention depth calculation unit configured to calculate a predicted time until the vehicle contacts one of the attention objects, on the basis of a recognition result of the attention object recognition unit and a recognition result of the traveling state recognition unit, and to calculate an attention depth for the attention object on the basis of the predicted time;

a display information generation unit configured to determine a first attention object having a largest attention depth among the plurality of attention objects, and to generate first display information regarding first attention display for highlighting the first attention object and third display information regarding third attention display which is a line surrounding second attention objects other than the first attention object among the plurality of attention objects, on the basis of the recognition result of the attention object recognition unit and the recognition result of the traveling state recognition unit; and a display control unit configured to display the first attention display and the third attention display on the display unit on the basis of the first display information and the third display information.

According to this disclosure, the first attention object having the largest attention depth among the plurality of attention objects is determined by the display information generation unit. The first display information regarding the first attention display for highlighting the first attention object and the third display information regarding third attention display which is the line surrounding the second attention objects other than the first attention object among the plurality of attention objects are generated on the basis of the recognition result of the attention object recognition unit and the recognition result of the traveling state recognition unit by the display information generation unit. The first attention display which is disposed at the position (attention position) of the first attention object on a windshield and is emphasized in accordance with the attention depth is displayed on the display unit by the display control unit. The third attention display having an extent (for example, the position of the line, area of the line, and the like) according to the positions of the respective attention objects is displayed on the display unit by the display control unit. For this reason, it is possible to urge a driver to pay attention to driving according to the automatic driving system by making the driver recognize an attention position, an attention depth, and the extent of attention.

(Item 4)

The information display device according to any one of items 1 to 3, wherein the attention depth calculation unit is configured to calculate the attention depth by calculating a reciprocal of the predicted time.

According to this disclosure, attention depths for the respective attention objects are calculated by the attention depth calculation unit on the basis of the predicted time (for example, TTC), and thus a larger attention depth is calculated as the predicted time becomes smaller. Thereby, it is possible to increase the attention depth in the attention object having a small predicted time. In general, a contact risk becomes greater as the predicted time becomes smaller. The reciprocal of the predicted time is adopted as the attention depth, and thus a change in the attention depth based on a change in the predicted time becomes larger as the predicted time becomes smaller. That is, the reciprocal of the predicted time is adopted as the attention depth, and thus it is possible to express that the automatic driving system strengthens monitoring as long as the contact risk becomes greater.

(Item 5)

The information display device according to any one of items 1 to 4, wherein the first attention display is a figure surrounding the first attention object.

According to this disclosure, a driver easily recognizes the position of the first attention object in the display unit.

(Item 6)

The information display device according to item 5, wherein the first attention display highlights the first attention object by changing a line thickness of the figure or color density of a filling-in of the figure in accordance with magnitude of the attention depth of the first attention object.

According to this disclosure, a driver easily recognizes the magnitude of the attention depth of the first attention object in the display unit.

What is claimed is:

1. An information display device that displays attention display during automatic driving of a vehicle, the information display device comprising:

an attention object recognition unit configured to recognize a plurality of attention objects present in a vicinity of the vehicle;

a traveling state recognition unit configured to recognize a traveling state of the vehicle;

a display unit configured to display attention display;

an attention depth calculation unit configured to calculate a predicted time until the vehicle contacts one of the attention objects during the automatic driving of the vehicle, on the basis of a recognition result of the attention object recognition unit and a recognition result of the traveling state recognition unit, and to calculate an attention depth for the attention object on the basis of the predicted time;

a display information generation unit configured to determine a first attention object having a largest attention depth among the plurality of attention objects, and to generate first display information regarding a first attention display for highlighting the first attention object and second display information regarding a second attention display associated with second attention objects other than the first attention object, among the plurality of attention objects, wherein the second attention display comprises a line surrounding the first attention object and the second attention objects, and wherein the first display information and the second display information is generated based on the recognition result of the attention object recognition unit and the recognition result of the traveling state recognition unit; and a display control unit configured to display the first attention display and the second attention display on the display unit on the basis of the first display information and the second display information during the automatic driving of the vehicle.

2. The information display device according to claim 1, wherein the second attention display is an envelope curve passing through outer sides of each position of the plurality of attention objects on a windshield of the vehicle as estimated by the attention object recognition unit.

3. The information display device according to claim 1, wherein the attention depth calculation unit is configured to calculate the attention depth by calculating a reciprocal of the predicted time.

4. The information display device according to claim 1, wherein the first attention display is a figure surrounding the first attention object.

5. An information display device that displays attention display during automatic driving of a vehicle, the information display device comprising:

an attention object recognition unit configured to recognize a plurality of attention objects present in a vicinity of the vehicle;

a traveling state recognition unit configured to recognize a traveling state of the vehicle;

a display unit configured to display attention display;

an attention depth calculation unit configured to calculate a predicted time until the vehicle contacts one of the attention objects during the automatic driving of the vehicle, on the basis of a recognition result of the attention object recognition unit and a recognition result of the traveling state recognition unit, and to calculate an attention depth for the attention object on the basis of the predicted time;

a display information generation unit configured to determine a first attention object having a largest attention depth among the plurality of attention objects, and to generate first display information regarding a first attention display for highlighting the first attention object and third display information regarding a third attention display associated with second attention objects other than the first attention object, among the plurality of attention objects, wherein the third attention display comprises a line surrounding the second attention objects, and wherein the first display information and the third display information is generated based on the recognition result of the attention object recognition unit and the recognition result of the traveling state recognition unit; and a display control unit configured to display the first attention display and the third attention display on the display unit on the basis of the first display information and the third display information during the automatic driving of the vehicle.

6. The information display device according to claim 4, wherein the first attention display highlights the first attention object by changing a line thickness of the figure or color density of a filling-in of the figure in accordance with magnitude of the attention depth of the first attention object.

* * * * *